(12) United States Patent
Asakura et al.

(10) Patent No.: US 7,030,320 B2
(45) Date of Patent: Apr. 18, 2006

(54) WATER CUTOFF STRUCTURE OF COVERED WIRE

(75) Inventors: Nobuyuki Asakura, Shizuoka (JP); Tetsuro Ide, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/687,963

(22) Filed: Oct. 20, 2003

(65) Prior Publication Data

US 2004/0238201 A1 Dec. 2, 2004

(30) Foreign Application Priority Data

| Oct. 18, 2002 | (JP) | ............................ P2002-304445 |
| Dec. 27, 2002 | (JP) | ............................ P2002-382555 |
| Jul. 1, 2003 | (JP) | ............................ P2003-270166 |

(51) Int. Cl.
*H01R 4/00* (2006.01)

(52) U.S. Cl. .................................................. 174/84 C

(58) Field of Classification Search ............. 174/74 R, 174/84 R, 94 R, 92; 156/580.2; 428/60; 439/460

See application file for complete search history.

(56) References Cited

U.S. PATENT DOCUMENTS

| 5,922,993 | A | * | 7/1999 | Ide et al. .................... 174/84 R |
| 5,925,202 | A | * | 7/1999 | Ide et al. .................... 156/73.2 |
| 5,929,384 | A | * | 7/1999 | Ide et al. .................... 174/84 R |
| 5,959,252 | A | * | 9/1999 | Ide et al. .................... 174/84 R |
| 5,997,340 | A | * | 12/1999 | Ito et al. ..................... 439/460 |
| 6,004,170 | A | * | 12/1999 | Kato et al. ................... 439/874 |
| 6,027,009 | A | * | 2/2000 | Shinchi ...................... 228/111.5 |
| 6,027,589 | A | * | 2/2000 | Kato et al. ................... 156/73.2 |
| 6,313,407 | B1 | * | 11/2001 | Shinchi et al. ............... 174/84 R |
| 6,327,777 | B1 | * | 12/2001 | Ide et al. ..................... 29/868 |

FOREIGN PATENT DOCUMENTS

| JP | 7-320842 A | 12/1995 |
| JP | 11-250952 A | 9/1999 |
| JP | 2000-182688 A | 6/2000 |

\* cited by examiner

*Primary Examiner*—William H. Mayo, III
(74) *Attorney, Agent, or Firm*—Sughrue Mion, PLLC

(57) ABSTRACT

A water cutoff structure of a covered wire comprising an upper side member and a lower side member for carrying out water cutoff to the covered wire by sandwiching a covered wire constituted by covering core lines by a pair of water cutoff members made of a resin respectively provided at the upper side member and the lower side member to be subjected to ultrasonic welding, in which the lower side member of the water cutoff structure is provided with a pair of locking portions and the pair of locking portions are respectively fitted to a pair of locking portions provided to correspond to the upper side member. Ultrasonic vibration energy is transmitted to concentrate on a welded portion.

14 Claims, 13 Drawing Sheets

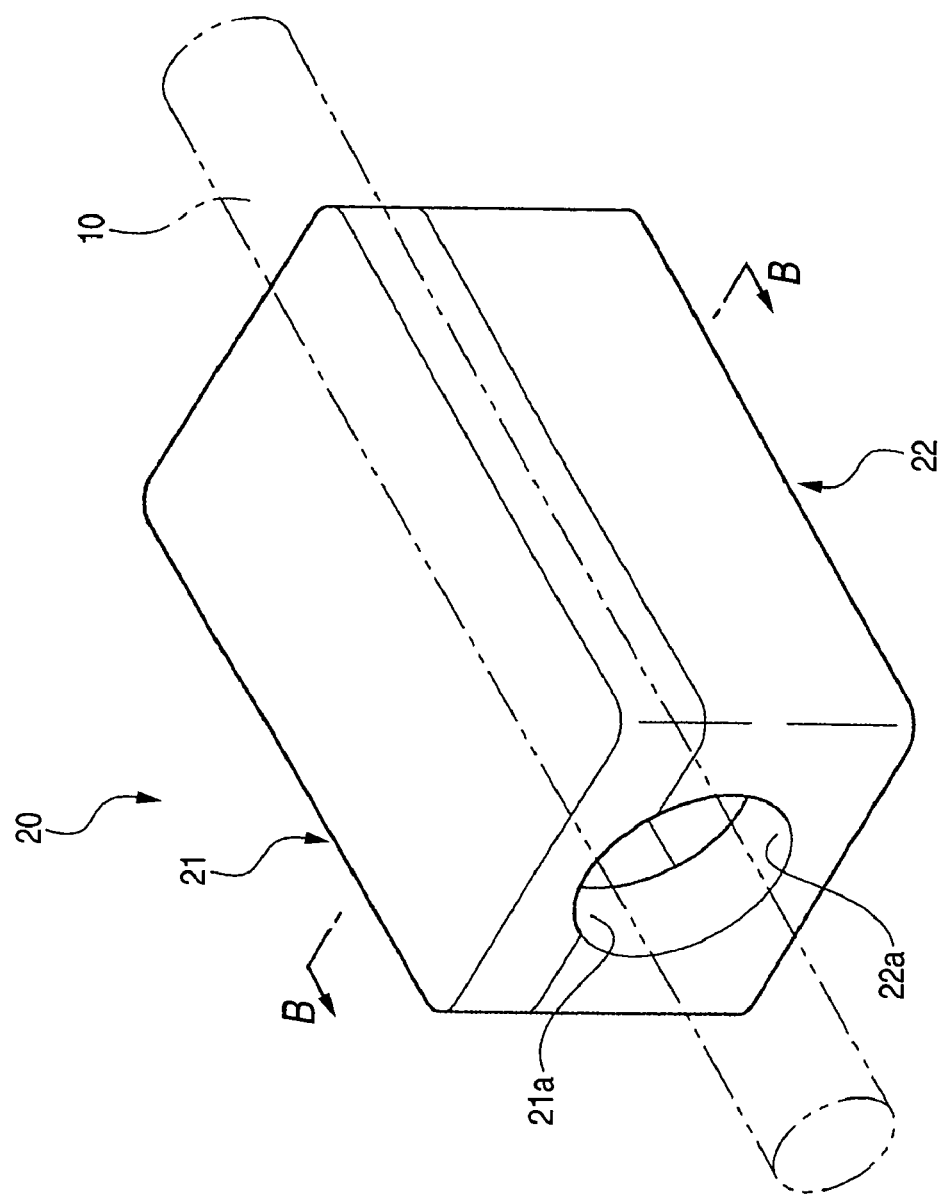

PRIOR ART

WATER CUTOFF STRUCTURE OF COVERED WIRE

The present application is based on Japanese Patent Applications Nos. 2002-304445, 2002-382555 and 2003-270166, the entire contents of which are incorporated herein by reference.

BACKGROUND OF THE INVENTION

1. Field of the Invention

The present invention relates to a water cutoff structure of a covered wire used in a wire harness of an automobile or the like. Specifically, the invention relates to a structure achieving water cutoff to the covered wire by sandwiching the covered wire constituted by covering core lines by a water cutoff member made of a resin to subject to ultrasonic welding.

2. Related Art

According to a wire harness of an automobile, water may continue invading via clearances among core lines of a covered wire, thereby, water may reach inside of an apparatus of a control unit or the like. In order to prevent the invasion, a wire harness used at a portion at which water may invade is normally provided with a water cutoff structure.

As an example of a water cutoff structure of this kind, there is known a constitution of sealing clearances among core lines of a terminal of an electric wire by enveloping a portion of connecting the terminal of the electric wire exposed to a portion at which water may invade by a thermally contractible tube with hot melt and molding the terminal connecting portion by hot melt (for example, refer to JP-A-2000-182688, page 2, FIG. 3).

Further, as shown by FIG. 11, there is also an example of creating a structure in which when electric wires are connected by utilizing ultrasonic vibration, water cutoff can be carried out at the same time. According to the example, when covered wires 1 and 2 are connected, the two electric wires 1 and 2 are overlapped at a connecting portion 3. Further, a cover resin is melted and resin chips 4 and 5 are melted together by sandwiching the overlapped connecting portion 3 by a pair of the resin chips 4 and 5 and applying ultrasonic vibration to the resin chips 4 and 5 while pressing the resin chips 4 and 5 from outer sides. At that occasion, the structure capable of carrying out water cutoff is finished by filling the molten resin among the core lines at a vicinity of the connecting portion (for example, refer to JP-A-7-320842, page 4, FIG. 1 and JP-A-11-250952).

According to the related art in which the terminal connecting portion is enveloped by the thermally contractible tube and molded by hot melt, a number of steps are taken and therefore, the operation is troublesome. Further, the constitution of sandwiching the electric wire connecting portion by the resin chips is inherently a technology when two pieces of electric wires are connected and therefore, it is difficult to ensure high water cutoff performance.

SUMMARY OF THE INVENTION

In reference to FIG. 12 and FIG. 13, there is a water cutoff structure of a covered wire 30 for carrying out a water cutoff processing by sandwiching the covered wire 30 by a pair of resin chips serving as upper and lower water cutoff members 31 made of a resin in FIG. 12 and applying an ultrasonic wave from an upper side of the water cutoff member 31 in FIG. 12 by an ultrasonic welding horn 32.

Each of the water cutoff members 31 is formed to be larger than a widening width of core lines of the covered wire 30 after ultrasonic welding. Thereby, in ultrasonic welding, the molten resin of the respective water cutoff member 31 is filled among the core lines of the covered wire 30 to thereby ensure a water cutoff function.

However, according to the structure of the water cutoff portion as described above, there is not provided a structure of concentrating ultrasonic vibration energy to a portion to be welded in welding and therefore, there poses a problem that time is taken in ultrasonic welding and an increase in cost is unavoidable.

Further, as shown by FIGS. 14 and 15, there also poses a problem that the water cutoff function is poor since the structure is devoid of airtightness.

Further, the melted cover of the electric wire extrudes to outside and damages the cover of the electric wire other than that at the welded portion and therefore, there poses a problem that force of fixedly attaching the electric wire and insulating performance cannot be ensured.

In consideration of the above-described situation, it is an object of the invention to provide a water cutoff structure of a covered wire capable of ensuring high water cutoff performance by simple operation and capable of reducing cost by achieving to shorten a welding time period.

(1) A water cutoff structure of a covered wire of the invention is characterized in a water cutoff structure of a covered wire comprising an upper side member and a lower side member for carrying out water cutoff for the covered wire by sandwiching the covered wire constituted by covering core lines by a pair of water cutoff members made of a resin respectively provided to the upper side member and the lower side member to subject to ultrasonic welding, wherein the lower side member of the water cutoff structure is provided with one locking portion and the locking portion is respectively fitted to other locking portion provided at the upper side member.

According to the water cutoff structure of the covered wire having the above-described constitution, by respectively providing the locking portions to the upper side member and the lower side member of the water cutoff structure, ultrasonic vibration energy is transmitted to concentrate on a welded portion. Therefore, the ultrasonic energy is efficiently transmitted thereto and a time period required for welding is shortened.

(2) According to the water cutoff structure of a covered wire of the invention, it is preferable that the locking portion is formed to be along a longitudinal direction of the water cutoff portion and orthogonal to the water cutoff member.

According to the water cutoff structure of the covered wire having the above-described constitution, by forming the locking portion in the longitudinal direction to be orthogonal to the water cutoff member, when the cover of the covered wire sandwiched by the water cutoff members is melted by ultrasonic vibration, a direction in which a welded substance of the covering material flows can be blocked and therefore, the welded substance can be prevented from extruding to outside. Further, the welding can be carried out without damaging the cover of the covered wire other than that at the welded portion.

(3) Further, according to the water cutoff structure of a covered wire of the invention, it is preferable that the locking portions are a projected portion and a recessed portion respectively provided to fit to the upper side member and the lower side member.

According to the water cutoff structure of the covered wire having the above-described constitution, by constituting the locking portions by the projected portion and the recessed portion, airtightness is further promoted, the cover of the covered wire melted in welding is not extruded to an outer side and therefore, welding can be carried out without damaging the cover of the covered wire other than that of the welded portion and therefore, the force of fixedly attaching the covered wire and the insulating function can be promoted.

(4) The water cutoff structure of a covered wire of the invention is characterized in that both sides of the locking portion of the lower side member are provided with a projected portion and a receiving portion on one side and both sides of the locking portion of the upper side member are provided with a projected portion and a receiving portion on other side fitted to the projected portion and the receiving portion of the lower side member.

According to the water cutoff structure of the covered wire having the above-described constitution, the projected portions and the receiving portions are formed to respectively fit to the both sides of the lower side member and the upper side member. Therefore, the shift in the longitudinal direction of the water cutoff structure is prevented and welding is finished without damaging the covered wire by the molten resin.

Further, by providing the projected portion and the receiving portion on the both sides of the locking portion, in addition to the constitution of the locking portions, the ultrasonic energy can further efficiently be transmitted to concentrate on the welded portion.

According to the water cutoff structure of the invention, one locking portion is provided at the lower side member of the water cutoff structure and the locking portion is respectively fitted to other locking portion provided at the upper side member.

Therefore, the ultrasonic vibration energy can be transmitted to concentrate on the welded portion, the ultrasonic energy can efficiently be transmitted and a time period dissipated in welding can be shortened.

Further, according to the water cutoff structure, the locking portion is formed to be along the longitudinal direction of the water cutoff structure and orthogonal to the water cutoff member.

Therefore, when the cover of the covered wire sandwiched by the water cutoff members is melted by ultrasonic vibration, a direction in which a melted substance of the covering member flows can be blocked and therefore, the melted substance can be prevented from extruding to outside and welding can be carried out without damaging the cover of the covered wire other than that of the welded portion.

Further, according to the water cutoff structure of the invention, the locking portions are constituted by the projected portion and the recessed portion provided to fit to the upper side member and the lower side member.

Therefore, airtightness is further promoted by constituting the locking portions by the projected portion and the recessed portion, the cover of the covered wire melted in welding is not extruded to the outer side and therefore, welding can be carried out without damaging the cover of the covered wire other than that of the welded portion and therefore, the force of fixedly attaching the covered wire and insulating performance can be promoted.

Further, according to the water cutoff structure of the invention, the both sides of the locking portion of the lower side member is provided with the projected portion and the receiving portion on one side and the both sides of the locking portion of the upper side member is provided with the projected portion and the receiving portion on the other side to fit to the projected portion and the receiving portion of the lower side member.

Therefore, the projected portions and the receiving portions are formed to respectively to fit the both sides of the locking portions of the lower side member and the upper side member and therefore, the shift in the longitudinal direction of the water cutoff structure is prevented and welding is finished without damaging the covered wire by the molten resin.

Further, by providing the projected portion and the receiving portion on the both sides of the locking portion, ultrasonic energy can further efficiently be transmitted to concentrate on the welded portion in cooperation with the constitution of the locking portion.

(5) A water cutoff structure of a covered wire according to the invention is characterized in that a single piece of a covered wire constituted by surrounding a plurality of core lines by a resin cover is sandwiched by a pair of water cutoff members having a lateral width wider than a width of laterally aligning the plurality of core lines and applying an ultrasonic oscillation to the water cutoff members in a state of being applied with a pressure from outer sides thereof to thereby fill the molten resin among the core lines of the covered wire to seal clearances among the core lines.

According to the water cutoff structure of a covered wire having the above-described constitution, by sandwiching the single piece of the covered wire by the pair of water cutoff members and applying the ultrasonic oscillation to the water cutoff members in a state of being applied with the pressure from the outer sides, the molten resin is filled among the core lines of the covered wire and therefore, water cutoff can be carried out by one action and a high water cutoff function can be achieved by a simple operation.

Particularly, since the lateral width of the water cutoff member is made wider than the width of laterally aligning the core lines, the total of the core lines can be enveloped by the molten resin, the molten resin can sufficiently be filled in the clearances among the core lines and the high water cutoff function can be achieved.

(6) A water cutoff structure of a covered wire according to the invention is further characterized in that each of the pair of water cutoff members includes a recessed groove for containing a melted substance of the resin cover at each of faces thereof for matching the water cutoff members and a partition wall for separating the recessed groove in two in a longitudinal direction of the covered wire and sandwiching the core lines exposed by removing the cover resin.

According to the water cutoff structure of the covered wire having the above-described constitution, the recessed grooves are provided at the matching faces of the water cutoff members and therefore, the melted cover resin can be escaped to the recessed grooves and welding of the water cutoff members can be promoted. Further, since the partition wall for dividing the recessed groove in two is provided, by melting the partition walls to integrate, the recessed grooves frontward and rearward therefrom can firmly be blocked by a single sheet of the wall. Therefore, even when water conducted through the core lines is brought into one of the recessed grooves in the water cutoff members, water can firmly be hampered from permeating further by the partition wall and water can completely be blocked.

Further, the partition wall having a limited contact area is locally brought into contact with the covered wire and therefore, ultrasonic energy is concentrated on the contact portion and melting is efficiently progressed. Therefore, the melted portion can be determined to a fixed point and therefore, the melting is not dispersed and the water cutoff structure having excellent quality is provided.

(7) A water cutoff structure of a covered wire is further characterized in that a projected streak extended in a direction intersecting with the longitudinal direction of the covered wire is provided at a face of the partition wall in contact with the covered wire and the matching faces at surroundings of the recessed grooves are provided with projections butted together when the water cutoff members are matched According to the water cutoff structure of a covered wire having the above-described constitution, the face of the partition wall in contact with the covered wire is provided with the projected streak extended in the direction intersecting with the longitudinal direction of the covered wire and therefore, the ultrasonic energy can be concentrated on the projected streak and the cover resin can efficiently be melted to scatter in a short period of time. Therefore, trouble by applying ultrasonic oscillation for a long period of time, for example, a phenomenon of bringing about a crack at the water cutoff member or the like can be prevented beforehand.

Further, the projection is provided also at the surrounding of the recessed groove for containing the melted cover resin and therefore, welding is started by constituting the onset by the position at which the projection is disposed and welding to integrated in a short period of time can be carried out.

(8) A water cutoff structure of a covered wire according to the invention is further characterized in that an auxiliary projected streak is provided in parallel with the projected streak.

According to the water cutoff structure of a covered wire having the above-described constitution, the face of the partition wall in contact with the covered wire includes the auxiliary projected streak other than the projected streak extended in the direction intersecting with the longitudinal direction of the covered wire and therefore, ultrasonic energy can further be concentrated and the cover resin can efficiently be melted to scatter in a shorter period of time.

(9) A water cutoff structure of a covered wire according to the invention is further characterized in that a peripheral edge rib is provided over an entire periphery of a peripheral edge of the matching face.

According to the water cutoff structure of a covered wire having the above-described constitution, since the peripheral edge rib is provided over the entire periphery of the peripheral edge of the matching face, ultrasonic energy can be concentrated not only on the face of the water cutoff structure in contact with the covered wire but over the total of the peripheral edge and the water cutoff performance can further be promoted.

(10) A water cutoff structure of a covered wire according to the invention is further characterized in that a plurality of stages of the partition walls are provided at intervals there among for separating the recessed groove in three or more in the longitudinal direction of the covered wire.

According to the water cutoff structure of a covered wire having the above-described constitution, the water cutoff member is provided with the plurality of stages of partition walls and therefore, a degree of bringing the resin and the core line into close contact with each other can be increased and the firm water cutoff effect can be achieved by the respective stages of the partition walls.

Further, by providing the plurality of stages of partition walls, even when a strand is constituted by a twisted wire, the molten resin can firmly be filled among the core lines and the high water cutoff effect can be achieved.

As has been explained above, according to the water cutoff structure of the invention, the water cutoff can be carried out by one action of applying the ultrasonic oscillation in the state of sandwiching the covered wire by the pair of water cutoff members and therefore, the high water cutoff function can be achieved by simple operation. Further, since the lateral width of the water cutoff member is made wider than the width of laterally aligning the core lines, the high water cutoff function can be achieved.

Further, according to the water cutoff structure of the invention, since the matching face of the water cutoff member is provided with the recessed groove for containing the melted cover resin, welding of the water cutoff members can be promoted. Further, since the partition wall for dividing the recessed groove in two is provided, by making the partition walls to integrate, the recessed grooves frontward and rearward therefrom can firmly be blocked by a single sheet of the wall and water can completely be blocked.

Further, the partition wall having a limited contact area is locally brought into contact with the covered wire and therefore, melting is progressed efficiently at the fixed point and the water cutoff structure having excellent quality eliminating dispersion of welding can be provided.

According to the water cutoff structure of the invention, since the projected streak is provided to extend over the total of the face of the partition wall in contact with the covered wire, the ultrasonic energy can be concentrated on the projected streak and the cover resin can efficiently be melted to scatter in a short period of time. Further, since the projection is provided also at the surrounding of the recessed groove, the welding is started by constituting the onset by the position at which the projection is disposed and the water cutoff members can be melted to integrate in a short period of time. Therefore, a phenomenon of bringing about a crack at the water cutoff member by applying the ultrasonic oscillation for a long period of time can be prevented beforehand.

According to the water cutoff structure of the invention, the projected streak is provided at the face of the partition wall in contact with the covered wire and the auxiliary projected streak is provided in parallel with the projected streak and therefore, the ultrasonic energy can further be concentrated on the projected streaks and the cover resin can efficiently be melted to scatter in a shorter period of time.

According to the water cutoff structure of the invention, the peripheral edge rib is provided over the entire periphery of the peripheral edge of the water cutoff structure and therefore, the welding is started by constituting the onset by the position at which the projected portion is disposed, the welding is carried in a short period of time and efficiency of the welding step can be promoted.

According to the water cutoff structure of the invention, the plurality of stages of the partition walls are provided at the partition walls and therefore, the degree of bringing the resin and the core line into close contact with each other can be increased, the firm water cutoff effect can be achieved by the respective stages of the partition walls and even when a strand is constituted by a twisted wire, the molten resin can firmly be filled among the core lines and the high water cutoff effect can be achieved.

BRIEF DESCRIPTION OF THE DRAWINGS

FIG. 2 is a perspective view showing a state after welding the water cutoff structure of FIG. 1 by ultrasonic welding;

FIG. 6A is an explanatory view of a method of applying ultrasonic vibration for forming a water cutoff structure, FIG. 6B is an outlook view showing a state of finishing the water cutoff structure and FIG. 6C is a sectional view taken along a line Ic—Ic of FIG. 6B;

FIG. 7A is a perspective view of a water cutoff member 120 for providing a water cutoff structure, FIG. 7B is a sectional view of a matching portion of a partition wall, FIG. 7C is an outlook view showing a state of finishing the water cutoff structure and FIG. 7D is a sectional view taken along IId—IId of FIG. 7C;

FIG. 8A is a perspective view of a water cutoff member 120B for providing a water cutoff structure and FIG. 8B is a sectional view of a matching portion of a partition wall;

FIG. 9A is a perspective view of a water cutoff member 120C for providing a water cutoff structure and FIG. 9B is a vertical sectional view of the water cutoff structure;

FIG. 10A is a perspective view of a water cutoff member 120D for providing a water cutoff structure and FIG. 10B is a vertical sectional view of the water cutoff structure;

DETAILED DESCRIPTION OF THE PREFERRED EMBODIMENTS

Figure 1:
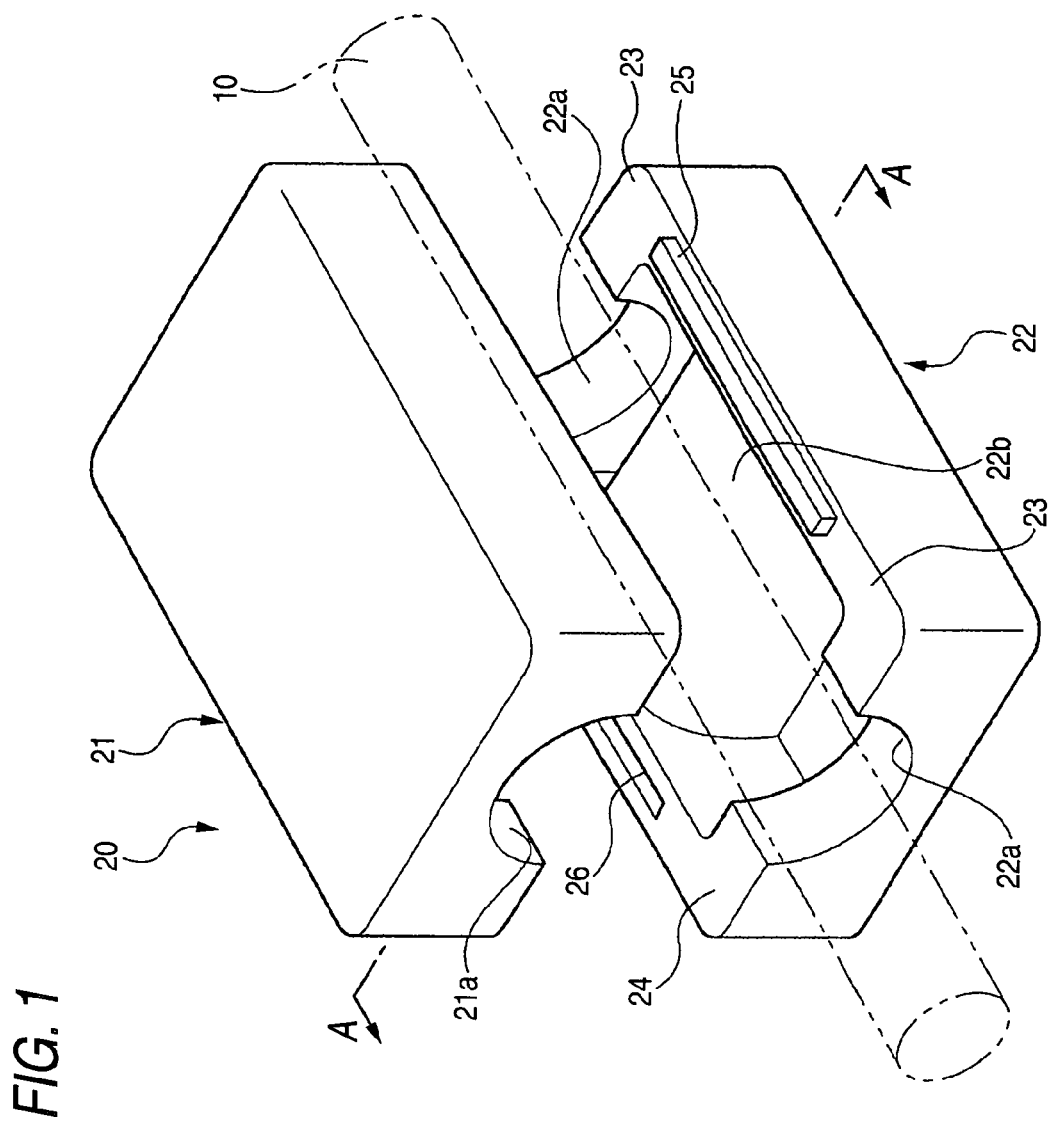
FIG. 1 is a disassembled perspective view showing a water cutoff structure of a covered wire according to an embodiment of the invention.
Figure 3A:
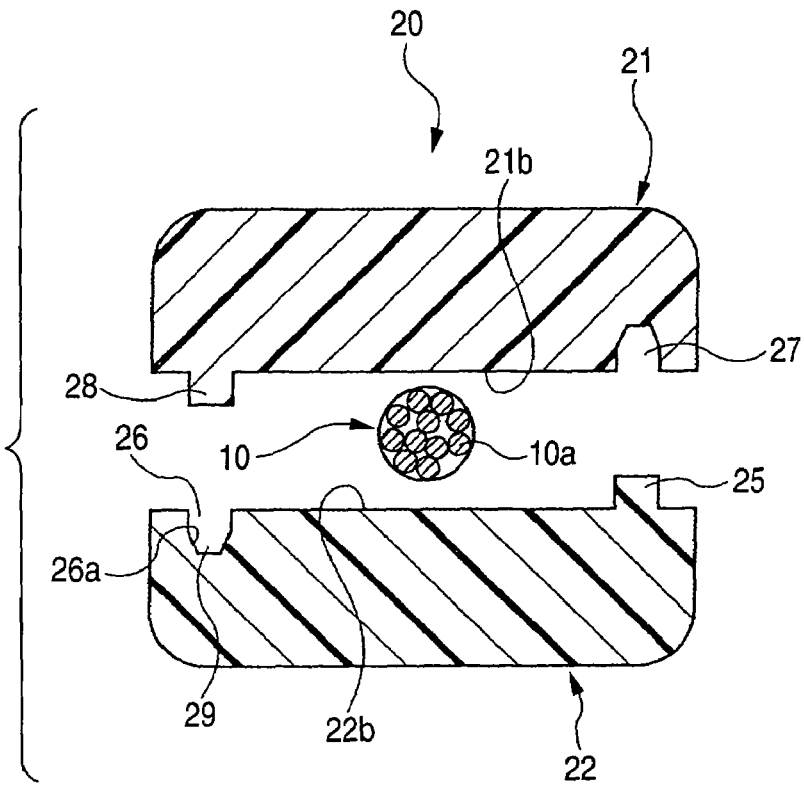
FIGS. 3A and 3B illustrate sectional views of the water cutoff structure of FIG. 1.
Figure 3B:
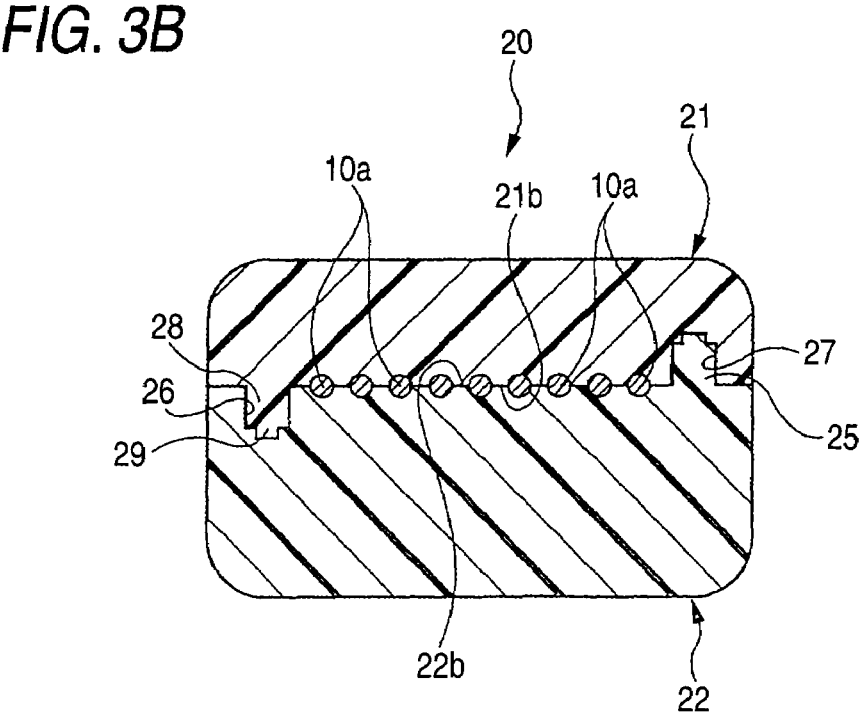
Figure 4A:
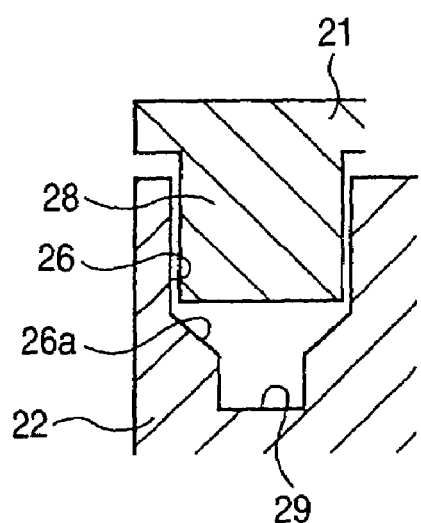
FIG. 4A is a sectional view showing an upper side member and a lower side member before fitting a water cutoff member of the water cutoff structure and FIG. 4B is a sectional view of the upper side member and the lower side member after having been fitted.
Figure 4B:
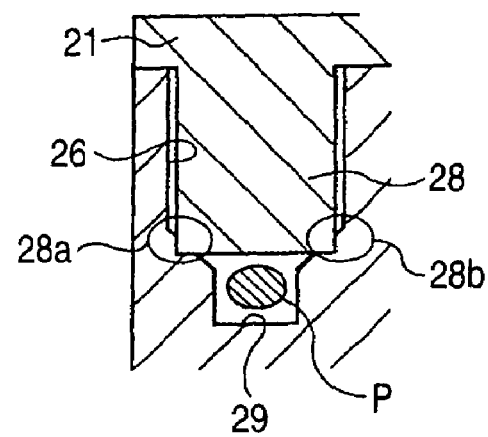
Figure 5:
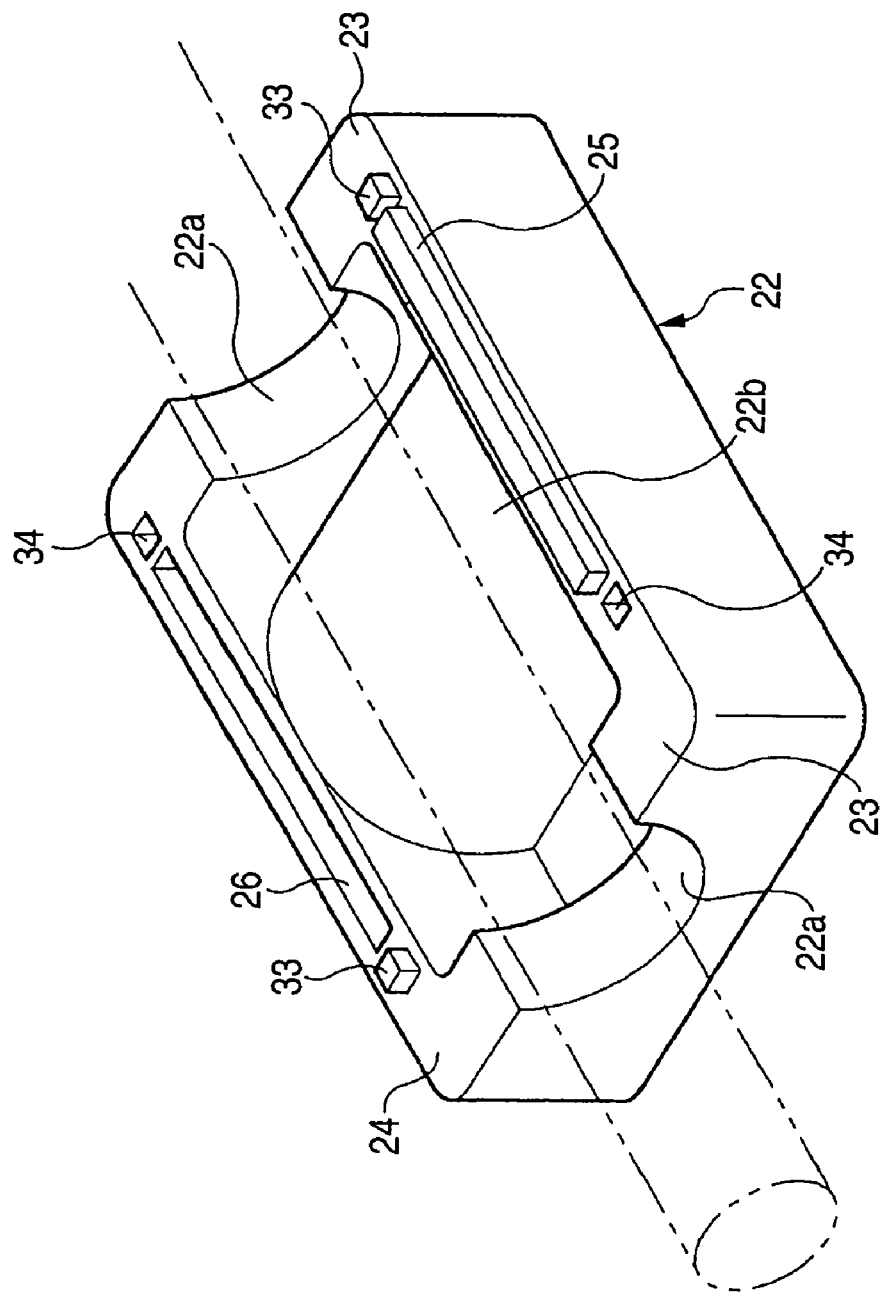
FIG. 5 is a perspective view showing a lower side member of a water cutoff structure according to a second embodiment of the invention.

An explanation will be given of a first embodiment of a water cutoff structure of a covered wire according to the invention in reference to FIG. 1 through FIG. 5 as follows. FIG. 1 is a disassembled perspective view showing a water cutoff structure of a covered wire according to an embodiment of the invention, FIG. 2 is a perspective view showing a state after subjecting the water cutoff structure of FIG. 1 to ultrasonic welding, FIGS. 3A and 3B illustrate sectional views of the water cutoff structure of FIG. 1, FIG. 3A is a sectional view taken along a line A—A of FIG. 1 showing a state before sandwiching a covered wire and FIG. 3B is a sectional view taken along a line B—B of FIG. 2 showing a state of subjecting the covered wire to ultrasonic welding. Further, FIG. 4A is a sectional view before fitting a locking portion of the water cutoff structure of FIG. 1, FIG. 4B is a sectional view after fitting the locking portion of the water cutoff structure and FIG. 5 is a perspective view showing a water cutoff structure of a covered wire according to other embodiment of the invention.

In reference to FIG. 1 through FIG. 5, in a water cutoff structure of a covered wire 10, a water cutoff member 20 made of a resin is constituted by an upper side member 21 and a lower side member 22 and a water cutoff processing is carried out for the covered wire 10 by exciting an ultrasonic wave from upper sides of FIG. 2 and FIGS. 3A and 3B by an ultrasonic wave welding horn, not illustrated, to the covered wire 10 constituted by covering core lines 10a (FIGS. 3A and 3B) in a state of being sandwiched between the upper side member 21 and the lower side member 22.

The upper side member 21 and the lower side member 22 of the water cutoff member 20 are respectively formed with pairs of wire guide grooves 21a and 22a for guiding the covered wire 10 at twos of left and right sides faces and provided with water cutoff portions 21b and 22b to be welded to the core lines 10a of the covered wire 10 by ultrasonic welding substantially at centers between the respective wire guide grooves 21a and 22a.

An upper end face 23 of a side wall of the lower side member 22 is provided with a projected portion 25 projected upwardly from the upper end face 23. An upper end face 24 of the lower side member 22 is formed with a recessed portion 26 in a groove-like shape. As shown by FIG. 4A, a width of the section of the recessed portion 26 is further reduced by an inclined face portion 26a and a groove portion 29 having a narrower width is formed at a bottom portion thereof.

The upper side member 21 is formed with a recessed portion 27 for fitting to the projected portion 25 and a projected portion 28 in correspondence with the projected portion 25 and the recessed portion 26. Further, a locking portion comprising the projected portion 25 and the recessed portion 26 as well as the recessed portion 27 and the projected portion 28 is formed in a longitudinal direction of the water cutoff structure 20 and orthogonally to the water cutoff member 22b. The projected portions 25 and 28 are of a barrier wall structure. The water cutoff portion 22 of the lower side member 22 is constituted by substantially a semicylindrical body having an axis line orthogonal to an axis line in the longitudinal direction of the water cutoff member 20.

Next, an explanation will be given of operation of the embodiment.

In the water cutoff structure of the covered wire 10, the water cutoff member 20 makes the covered wire 10 to be subjected to water cutoff disposed between the upper side member 21 and the lower side member 22, guides the covered wire 10 the respective wire guide grooves 21a and 22a of the upper side member 21 and the lower side member 22 and sandwiches the covered wire 10 between the water cutoff portion 21b of the upper side member 21 and the water cutoff portion 22b of the lower side member 22 (refer to FIG. 3A).

Under the state, at the water cutoff member 20, ultrasonic vibration is excited by an ultrasonic welding horn from an upper side to upper faces of the upper side member 21 and the lower side member 22 in FIGS. 2, 3A and 3B. The oscillated water cutoff member 20 melts the cover of the sandwiched covered wire 10 between the water cutoff portion 21b of the upper side member 21 and the water cutoff portion 22b of the lower side member 22, also melts the respective water cutoff portions 21b and 22b and welds the core lines 10a of the covered wire 10 to the respective water cutoff portions 21b and 22b (refer to FIG. 31B). Thereby, the covered wire 10 is subjected to the water cutoff processing for cutting off water invading via intervals among the core lines 10a.

FIG. 4A shows a sectional view of a portion of fitting the upper side member 21 and the lower side member 22 before welding to fit. First, after fitting the members as shown by FIG. 4B, when ultrasonic vibration is excited by the ultrasonic welding horn, oscillation is concentrated on a portion at which two edge portions 28a and 28b of the projected portion 28 of the upper side member 21 are brought into contact with the inclined face portion 26a to weld efficiently and a melted resin P is filled to the groove portion 29 to further promote airtightness.

Next, an explanation will be given of a second embodiment of a water cutoff structure of a covered wire according to the invention in reference to FIG. 5. An explanation will be given by attaching the same reference notations to portions the same as those of the first embodiment.

Figure 15:
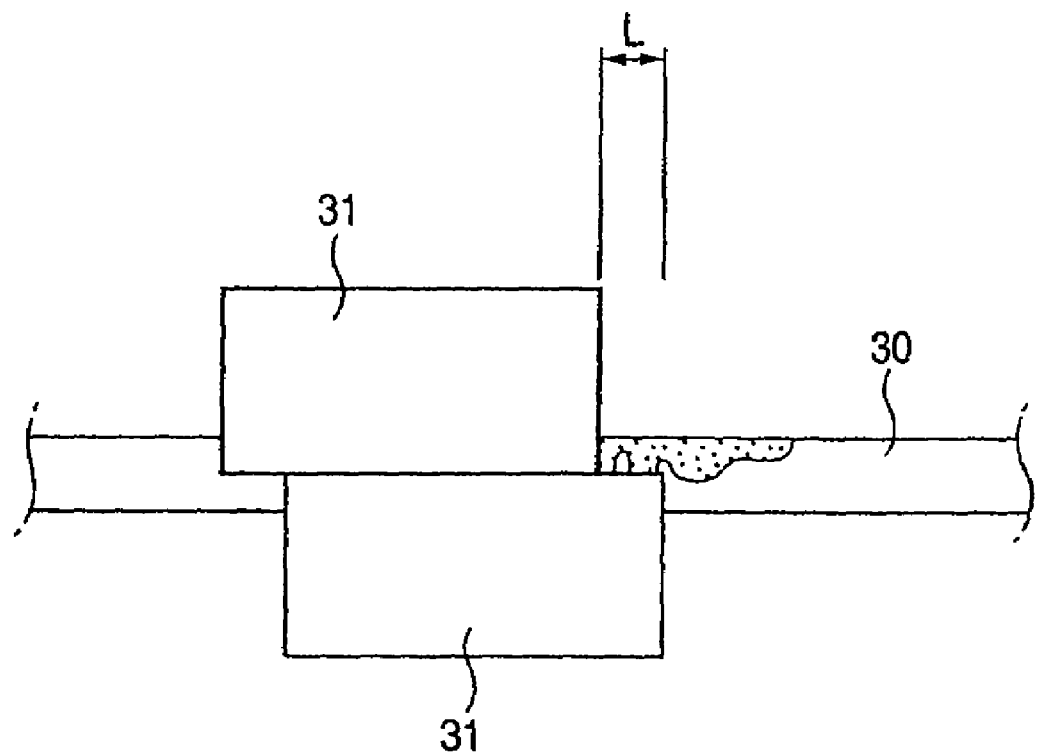
FIG. 15 is a side view of the water cutoff structure of the art relating to the invention.

According to the water cutoff member 20 of the covered wire of the embodiment, destruction of the covered wire 10 and exposure of the core line are prevented by preventing a longitudinal shift L between an upper resin part and a lower resin part 31, 31 (refer to FIG. 15).

The upper side member 21 and the lower side member 22 of the water cutoff member 20 are respectively formed with the pairs of wire guide grooves 22a for guiding the covered wire 10 at twos of the left and right side faces and provided with the water cutoff portions 21b and 22b to be welded to the core lines 10a of the covered wire 10 by ultrasonic welding substantially at centers between the respective wire guide grooves 22a. The water cutoff portion 22b is constituted by a semicylindrical shape, the covered wire 10 is arranged at an upper portion of the semicylindrical shape and ultrasonic welding is carried out by sandwiching to hold the covered wire by a lower face of the upper side member 21.

Similar to the first embodiment, the upper end face 23 of the side wall of the lower side member 22 is provided with the projected portion 25 projected upwardly from the upper end face 23. Further, the upper end face 24 of the lower side member 22 is formed with the recessed portion 26 in the groove-like shape. The projected portion 25 and the recessed portion 26 are formed in the longitudinal direction of the water cutoff structure 20 and orthogonally to the water cutoff member 22b. The projected portion 25 is of the barrier wall structure.

Further, according to the embodiment, for preventing longitudinal shift of the upper side members and the lower side member 21, positioning projected portions 33 and positioning receiving portions 34 of the upper side member 21 and the lower side member 22a are provided frontward and rearward from the projected portion 25 and the recessed portion 26 in the axis line in the longitudinal direction. The positioning projected portion 33 and the positioning receiving portion 34 of the upper side member 21 are arranged to be opposed to the positioning projected portion 33 and the positioning receiving portion 34 of the lower side member 22 and arranged to be opposed to each other centering on the axis line in the longitudinal direction of the water cutoff structure 20.

According to the water cutoff structure constituted in this way, the water cutoff processing is carried out for the covered wire 10 by exciting an ultrasonic wave from the upper side of FIG. 5 by an ultrasonic welding horn, not illustrated, in a state of sandwiching the covered wire 10 constituted by covering the wire line 10a (FIGS. 3A and 3B) between the upper side member 21 and the lower side member 22.

By preventing the longitudinal shift between the upper side member 21 and the lower side member 22 of the water cutoff member 20 in this way, the covered wire is welded without being damaged and therefore, the core lines are not exposed and reliability of insulating performance is promoted.

Further, ultrasonic energy is efficiently transmitted to a total of the resin in cooperation with the locking portion and therefore, crack of resin part brought about by the longitudinal shift can be prevented and a problem in view of outlook can also be resolved.

Next, an explanation will be given of a third embodiment of a water cutoff structure of a covered wire according to the invention.

Figure 6A:
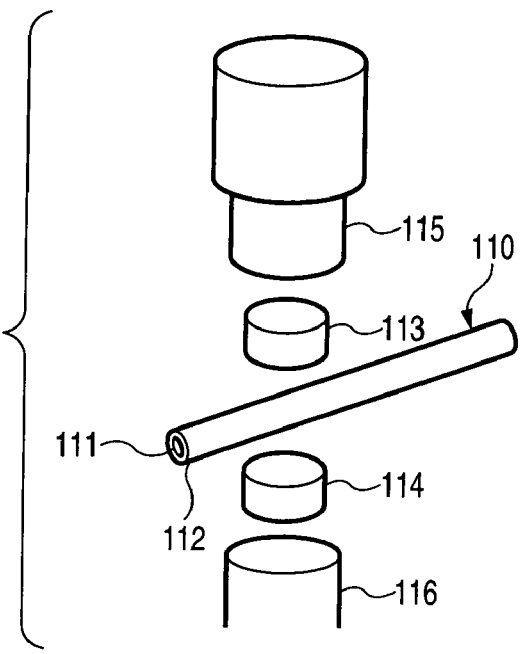
FIGS. 6A through 6C illustrate explanatory views showing a third embodiment of a water cutoff structure of a covered wire according to the invention.
Figure 6B:
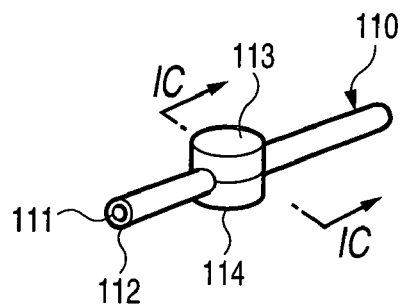
Figure 6C:
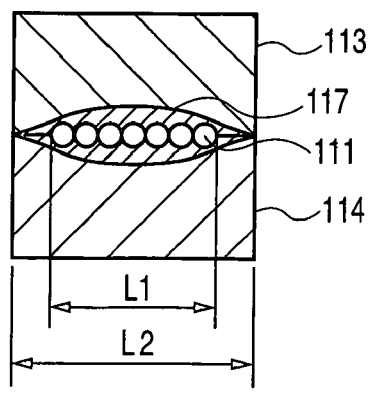

FIGS. 6A through 6C illustrate explanatory views of the third embodiment of a water cutoff structure of a covered wire according to the invention, FIG. 6A is an explanatory view of a method of applying ultrasonic vibration for forming a water cutoff structure, FIG. 6B is an outlook view showing a state of finishing the water cutoff structure and FIG. 6C is a sectional view taken along a line Ic—Ic of FIG. 6B.

According to a water cutoff structure of a covered wire of the embodiment, a single piece of a covered wire 110 constituted by surrounding a plurality of core lines 111 by a resin cover 112 is sandwiched by a pair of water cutoff members 113 and 114 formed of resin chips having a lateral width L2 wider than a width L1 of laterally aligning the plurality of core lines ill and ultrasonic wave oscillation is applied to the water cutoff members 113 and 114 in a state of applying pressure thereto from outer sides by a horn 115 and an anvil 116 to thereby fill a molten resin 117 among the core lines 111 of the covered wire 110 to seal clearances among the core lines 111.

That is, when the ultrasonic vibration is applied from the outer sides of the water cutoff members 113 and 114, ultrasonic energy is transmitted firstly to the covered wire 110 from the water cutoff members 113 and 114. Further, the resin cover 112 generates heat to melt by the energy, the cover resin 112 is removed by pressure applied to the water cutoff members 113 and 114 and the water cutoff members 113 and 114 on upper and lower sides are melted together. At this occasion, the molten resin is filled among the core lines 111 of the covered wire 110, the clearances among the core lines 111 are sealed and water is prevented from permeating via the clearances among the core lines 111.

As described above, the water cutoff structure of a covered wire according to the embodiment can be produced by simple operation of one action of applying ultrasonic vibration in the state of sandwiching the covered wire 110 by the water cutoff members 113 and 114. Further, by making the lateral width L2 of the water cutoff members 113 and 114 wider than the width L1 of laterally aligning the core lines 111, the total of the core lines 111 can be enveloped by the molten resin 117, the molten resin 117 can be sufficiently brought over to the clearances among the core lines 111 and high water cutoff function can be achieved.

Further, as a material of the water cutoff members 113 and 114 on the upper and the lower sides, a noncrystalline resin of PEI (polyetherimide), PAR (polyallylate), PES (polyether sulfone) or the like is preferable in ensuring heat resistance and performance of being melted by the ultrasonic wave.

Next, a fourth embodiment of a water cutoff structure of a covered wire according to the invention will be explained in reference to FIGS. 7A through 7D.

In the cutoff structure of a covered wire according to the embodiment, a pair of water cutoff members, mentioned above, as shown by FIG. 7A are used. The water cutoff member 120 is constituted by substantially a shape of a rectangular plate and is provided with a recess 121 for receiving a melted substance of the resin cover 112 and a partition wall 122 separating the recess 121 in two in a longitudinal direction of the covered wire and sandwiching the core lines 111 exposed by removing the cover resin 112 at each of faces 120*a* to be matched together by sandwiching the covered wire 110.

Further, both ends of the water cutoff member are provided with semicircular recesses 123 for passing the covered wire 110. Further, a lateral width L3 of the water cutoff member 120 is made wider than the width L1 for laterally aligning the core lines 111 of the covered wire 110.

Figure 7A:
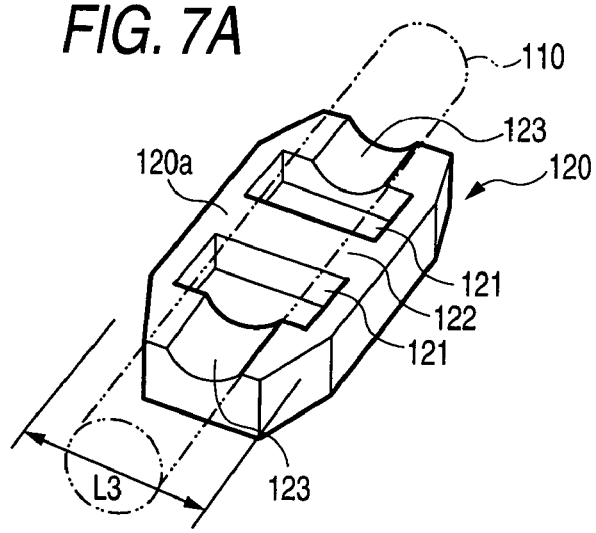
FIGS. 7A through 7D illustrate explanatory views showing a fourth embodiment of a water cutoff structure of a covered wire according to the invention.
Figure 7B:
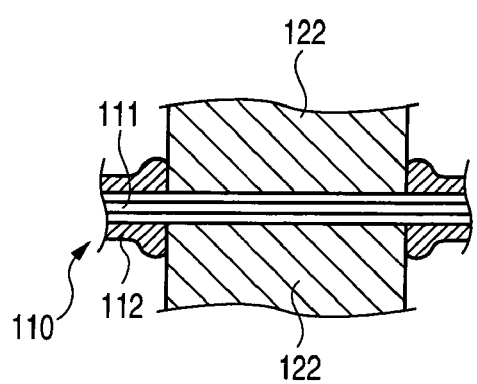

The covered electric fire 110 is sandwiched from the upper and the lower sides by the pair of water cutoff members 120 having the same structure and ultrasonic vibration is applied while pressing by the horn and the anvil. Then, as shown by FIG. 7B, by bringing the partition wall 122 having a limited contact area locally into contact with the covered wire 110, ultrasonic energy is concentrated on the contact portion and melting of the cover resin 112 is efficiently progressed.

Figure 7C:
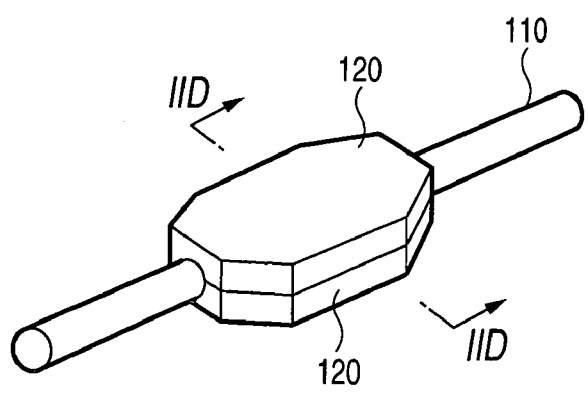
Figure 7D:
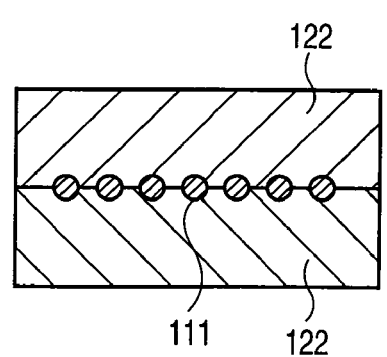

Further, by receiving the melted cover resin 112 to the recess 121 of the match face 120*a* of the water cutoff member 120, welding of the water cutoff members 120 is promoted. As a result, a water cutoff structure having an outlook of FIG. 7C is provided. At this occasion, at inside thereof, as shown by FIG. 7D, end portions of the melted partition walls 122 are filled among the core lines 111 of the covered wire 110 and clearances among the core lines 111 are sealed.

As described above, according to the water cutoff structure of the covered wire of the embodiment, the water cutoff member 120 is provided with the partition wall 122 for dividing the recess 121 in two and therefore, by melting to integrate the partition walls 122, the recesses 121 frontward and rearward therefrom are blocked firmly by a single sheet of the wall.

Therefore, even when water conducted through the clearances among the core lines 111 is brought into one of the recesses 121 at inside of the water cutoff member 120, water can firmly be hampered from permeating further by the partition wall 122 and water can completely be blocked.

Further, by providing the partition wall 122, the melted portion can be determined at the fixed point and therefore welding is not dispersed and the water cutoff structure having excellent quality is achieved.

Figure 8A:
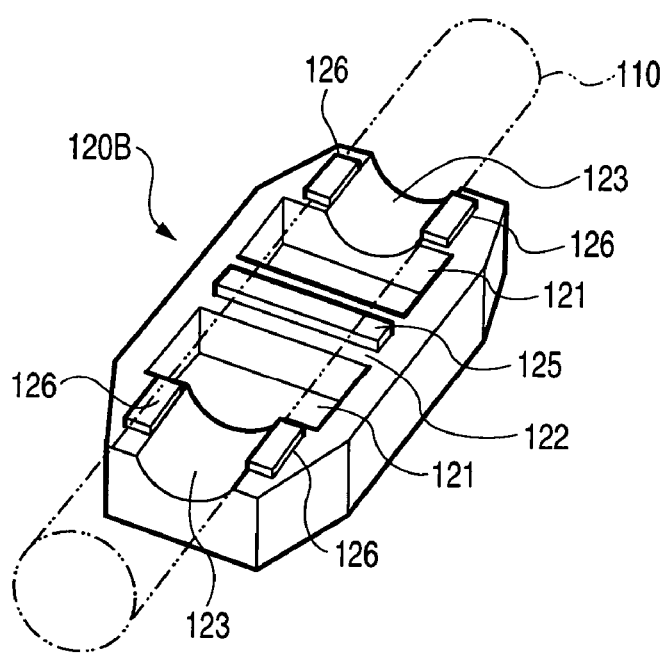
FIGS. 8A and 8B illustrate explanatory views showing a fifth embodiment of a water cutoff structure of a covered wire according to the invention.

Next, a fifth embodiment of a water cutoff structure of a covered wire according to the invention will be explained in reference to FIGS. 8A and 8B.

According to the water cutoff structure of the covered wire of the embodiment, a pair of water cutoff members, mentioned above, as shown by FIG. 8A are used. The water cutoff member 120B is provided with a projected rib 125 extended in a direction intersecting with the longitudinal direction of the covered wire at an upper face (face brought into contact with the covered wire) of the partition wall 122 of the water cutoff member 120 of FIG. 7A.

Further, the matching face 120*a* at a surrounding of the recess 121 is provided with projections 126 butted together when the water cutoff members 120B are matched together. Other than these is similar to that in the fourth embodiment.

Figure 8B:
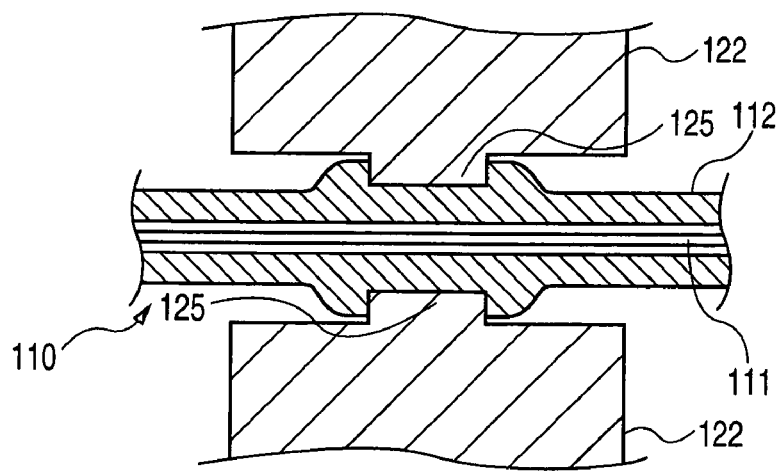

When the water cutoff member 120B is used, as shown by FIG. 8B, the ultrasonic energy can further be concentrated on the projected rib at the upper face of the partition wall 122 and therefore, the cover resin 112 can efficiently be guided to scatter in a short period of time. Therefore, trouble by applying ultrasonic vibration for a long period of time, for example, a phenomenon of bringing about a crack at the water cutoff member 120B or the like can be prevented beforehand.

Further, the projection 126 is also provided at the surrounding of the recess 121 for receiving the melted cover resin 112 and therefore, the welding operation is started by constituting an onset by a position at which the projection 126 is disposed and the water cutoff members 120B can be melted to integrate in a short period of time.

Figure 9A:
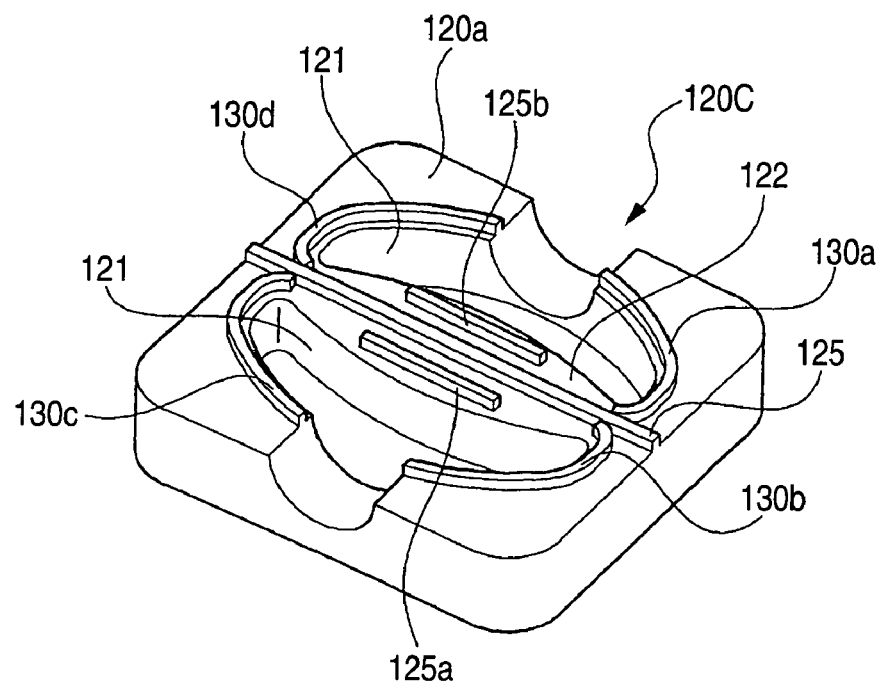
FIGS. 9A and 9B illustrate explanatory views showing a sixth embodiment of a water cutoff structure of a covered wire according to the invention.
Figure 9B:
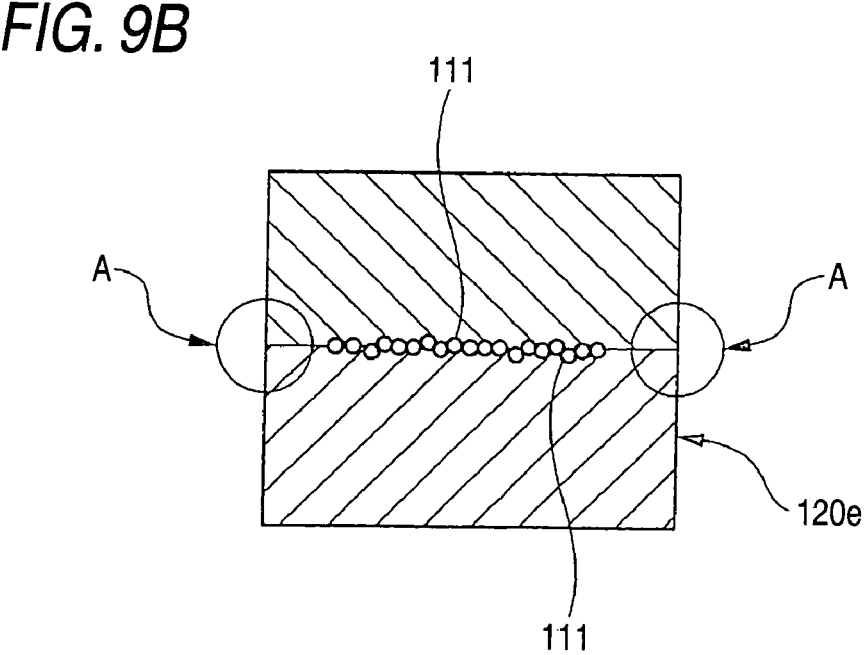

Next, a sixth embodiment of a water cutoff structure of a covered wire according to the invention will be explained in reference to FIG. 9A and FIG. 9B.

According to the water cutoff structure of a covered wire of the embodiment, a pair of water cutoff members, mentioned above, shown in FIG. 9A are used. The water cutoff member is constituted substantially by a shape of a rectangular plate four corner portions of which are faced. Each of the faces 120*a* matched together by sandwiching the covered wire is provided with the recess 121 having substantially an oval shape for receiving the melted substance of the resin cover 112 and the partition wall 122 for separating the recess 121 in two in the longitudinal direction of the covered wire and sandwiching the core lines 111 exposed by removing the cover resin. Further, a thickness of the partition wall 122 is increased at a central portion thereof intersected with the covered wire. The total of the width of the upper face (face brought into contact with the covered wire) of the partition wall 122 is provided with the projected rib extended in the direction intersecting with the longitudinal direction of the covered wire.

Further, auxiliary projected ribs 125*a* and 125*b* are provided in parallel with the projected rib 125. Further, peripheral edge ribs 130*a*, 130*b*, 130*c* and 130*d* are provided over an entire periphery of a peripheral edge portion of the chip 120C. Thereby, water cutoff function of the peripheral edge portion of the water cutoff member 120C is promoted. When the water cutoff member 120C is used, as shown by FIG. 9B, the ultrasonic energy can further be concentrated on the projected ribs 125, 125*a* and 125*b* over the total of the upper face of the partition wall 122 and after welding, welding performance is promoted at a portion designated by a circle mark A in FIG. 9B. Therefore, invasion of water can firmly be cutoff at the center of the part and over the total periphery of the peripheral edge portion.

Figure 10A:
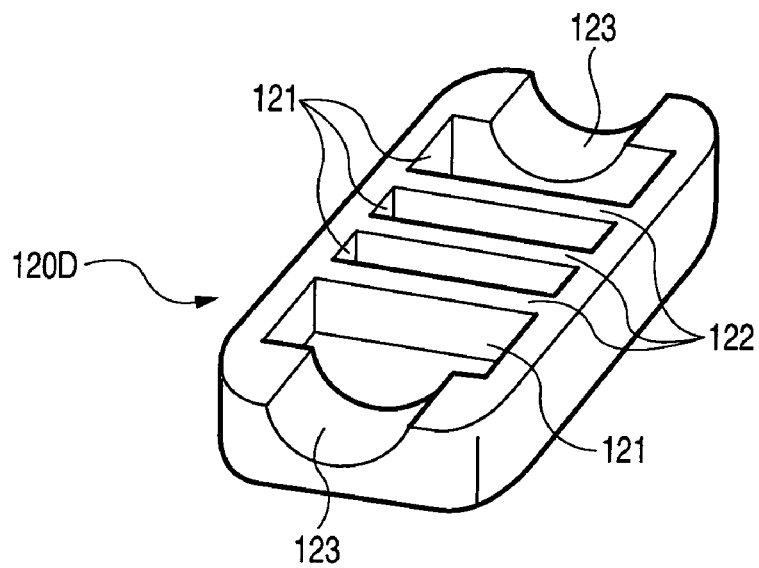
FIGS. 10A and 10B illustrate explanatory views showing a seventh embodiment of a water cutoff structure of a covered wire according to the invention.

Next, a seventh embodiment of a water cut off structure of a covered wire according to the invention will be explained in reference to FIGS. 10A and 10B.

According to the water cutoff structure of the covered wire of the embodiment, as a pair of water cutoff members, mentioned above, as shown by FIG. 10A are used. The water cutoff member 120D is provided with a plurality of stages (3 stages in the illustrated example) of the partition walls 122 of the water cutoff member 120 of FIG. 7A at intervals there among. Further, the recess 121 is separated in three or more (four in the illustrated example) in the longitudinal direction of the covered wire. Other than these is similar to that in the fourth embodiment.

Figure 10B:
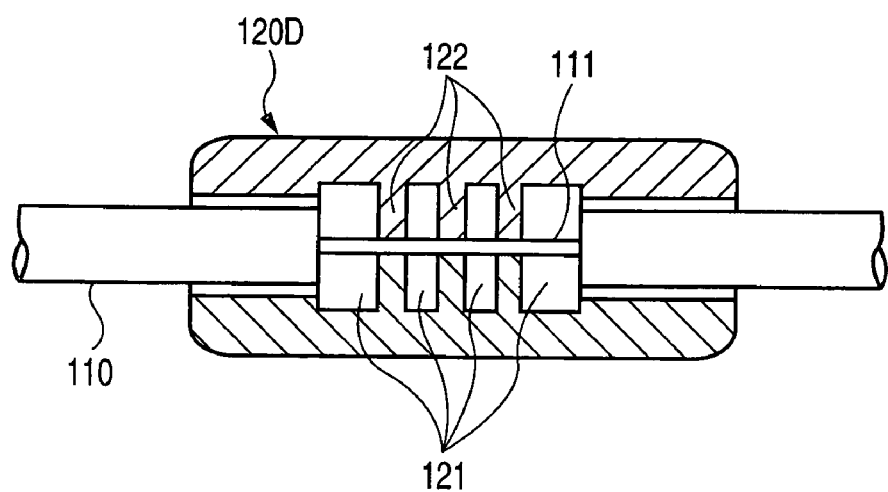
Figure 11:
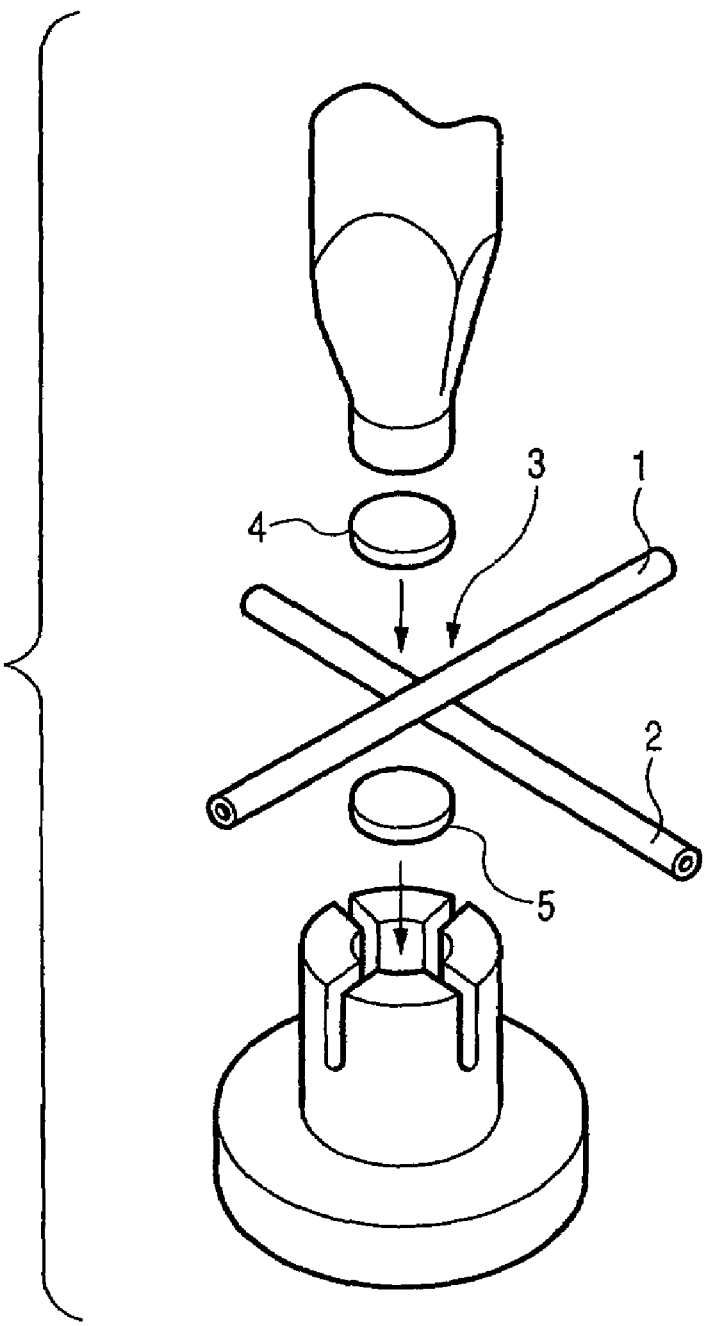
FIG. 11 is an explanatory view showing a water cutoff method of a covered wire of a related art.
Figure 12:
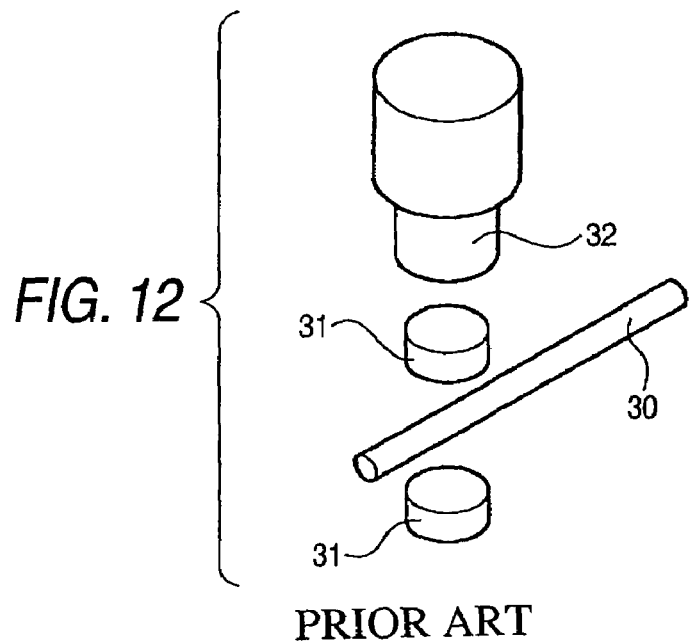
FIG. 12 is a disassembled perspective view showing a water cutoff structure of an art relating to the invention.
Figure 13:
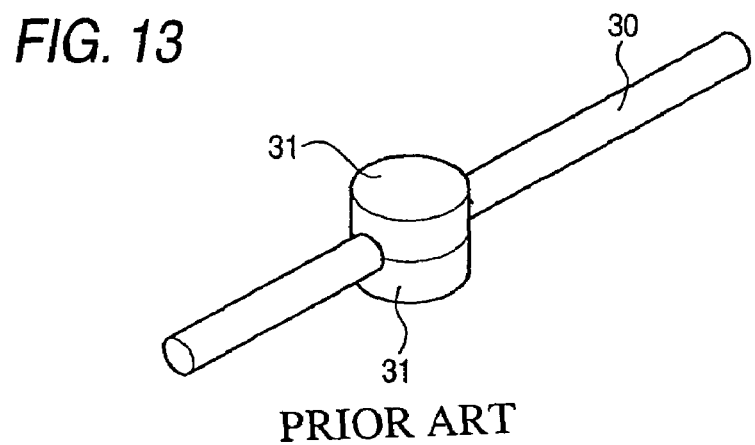
FIG. 13 is a perspective view showing a state after welding the water cutoff structure of FIG. 12 by ultrasonic welding.
Figure 14:
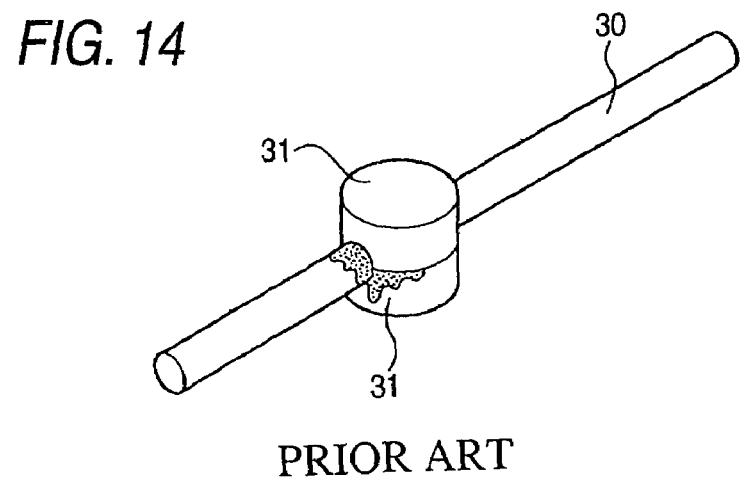
FIG. 14 is a perspective view of a water cutoff structure of the art relating to the invention.

By providing the plurality of stages of partition walls 122 at the water cutoff member 120D in this way, as shown by FIG. 10B, a degree of bringing the resin and the core lines 111 into close contact with each other can be increased and the firm water cutoff effect can be achieved by the respective stages of the partition walls 122.

Further, by providing the plurality of stages of partition walls 122, even when a strand is constituted by a twisted wire, the molten resin can firmly be filled among the core lines 111 and high water cutoff effect can be achieved.

What is claimed is:

1. A water cutoff structure of a covered wire, in which a first member and a second member having first and second water cutoff portions made of a resin respectively are attached on the covered wire by ultrasonic welding to thereby provide water cutoff, wherein the first member has a first locking portion and the second member has a second locking portion, and the first and second locking portions are fitted to each other;

wherein the first locking portion is formed to be along the first water cutoff portion so as to extend substantially orthogonal to a mating surface of the first member.

2. The water cutoff structure according to claim 1, wherein the first and second locking portions are a projected portion and a recessed portion respectively which are fitted to each other.

3. A water cutoff structure of a covered wire, in which a first member and a second member having first and second water cutoff portions made of a resin respectively are attached on the covered wire by ultrasonic welding to thereby provide water cutoff, wherein the first member has a first locking portion and the second member has a second locking portion, and the first and second locking portions are fitted to each other;

wherein opposite sides of the first locking portion are provided with a first positioning projected portion and a first positioning receiving portion respectively and opposite sides of the second locking portion are provided with a second positioning receiving portion fitted to the first positioning projected portion and a second positioning projected portion fitted to the first positioning receiving portion, respectively.

4. A water cutoff structure of a covered wire, in which a first member and a second member having first and second water cutoff portions made of a resin respectively are attached on the covered wire by ultrasonic welding to thereby provide water cutoff, wherein the first member has a first locking portion and the second member has a second locking portion, and the first and second locking portions are fitted to each other;

wherein the first and second locking portions are a projected portion and a recessed portion respectively which are fitted to each other; and wherein the recessed portion includes a groove portion at a bottom portion of the recessed portion and said groove portion is narrower than an upper portion of the recessed portion.

5. A water cutoff structure of a covered wire constituted by surrounding a plurality of core lines covered by a resin cover, in which a first member and a second member made of a resin are attached on the covered wire by ultrasonic welding to thereby provide water cutoff, wherein each of the first and second members has a lateral width wider than a width when the core lines are laterally arrayed, and molten resin is filled among the core lines to seal clearance among the core lines by applying ultrasonic vibration in a state that a pressure is applied from outer sides of the covered wire.

6. The water cutoff structure according to claim 5, wherein at least the first member of the first and second members includes a recess for receiving a melted substance of the resin cover on a mating surface of the first member to the second member, and at least one partition wall dividing the recess in a longitudinal direction of the covered wire and sandwiching the core lines that are exposed when the resin cover is removed.

7. The water cutoff structure according to claim 6, wherein a projected rib extended in a direction intersecting with the longitudinal direction of the covered wire is provided at a face of the partition wall in contact with the covered wire and a projection is formed on a matching surface on another side of the recess, said matching surface abutting to a mating surface of the second member.

8. The water cutoff structure according to claim 7, wherein the projected rib is extended over an entire width of the first member and an auxiliary projected rib is further provided in parallel with the projected rib.

9. The water cutoff structure according to claim 7, wherein a peripheral edge rib is provided over an entire periphery of a peripheral edge of the matching face of the first member.

10. The water cutoff structure of a covered wire according to claim 7, wherein a plurality of stages of the partition walls are provided at intervals, thereby dividing the recess in three or more in the longitudinal direction of the covered wire.

11. A water cutoff structure comprising:

a wire;

a first member including a first water cutoff portion and a projected portion;

a second member including a second water cutoff portion and a recessed portion;

wherein said wire is provided between said first member and said second member, said projected portion and said recessed portion are provided outside of the region where said first member and said second member contact said wire; and said projected portion is fit to said recessed portion;

wherein said projected portion is formed to be along the first water cutoff portion so as to extend substantially orthogonal to a mating surface of the first member.

12. The water cutoff structure of claim 11 wherein:

said first member further comprises a recessed portion;

said second member further comprises a projected portion; and said projected portion of said second member is fit to said projected portion of said first member.

13. A water cutoff structure comprising:

a wire;

a first member including a first water cutoff portion and a projected portion;

a second member including a second water cutoff portion and a recessed portion;

wherein said wire is provided between said first member and said second member, said projected portion and said recessed portion are provided outside of the region where said first member and said second member contact said wire; and said projected portion is fit to said recessed portion;

wherein opposite sides of said projected portion are provided with a first positioning projected portion and a first positioning receiving portion respectively and opposite sides of said recessed portion are provided with a second positioning receiving portion fitted to the first positioning projected portion and a second positioning projected portion fitted to the first positioning receiving portion, respectively.

14. A water cutoff structure comprising:

a wire;

a first member including a first water cutoff portion and a projected portion;

a second member including a second water cutoff portion and a recessed portion;

wherein said wire is provided between said first member and said second member, said projected portion and said recessed portion are provided outside of the region where said first member and said second member contact said wire; and said projected portion is fit to said recessed portion;

wherein the recessed portion includes a groove portion at a bottom portion of the recessed portion and said groove portion is narrower than an upper portion of the recessed portion.

* * * * *